(12) United States Patent
Yamakata et al.

(10) Patent No.: US 7,679,246 B2
(45) Date of Patent: Mar. 16, 2010

(54) ACTUATOR

(75) Inventors: Masaaki Yamakata, Tokyo (JP); Yuji Kobayashi, Tokyo (JP); Kiyoshi Akiyama, Tokyo (JP)

(73) Assignee: Rigaku Corporation, Tokyo (JP)

( * ) Notice: Subject to any disclaimer, the term of this patent is extended or adjusted under 35 U.S.C. 154(b) by 756 days.

(21) Appl. No.: 10/575,681

(22) PCT Filed: Jul. 8, 2004

(86) PCT No.: PCT/JP2004/010071

§ 371 (c)(1),
(2), (4) Date: Dec. 19, 2006

(87) PCT Pub. No.: WO2005/039019

PCT Pub. Date: Apr. 28, 2005

(65) Prior Publication Data

US 2007/0132328 A1    Jun. 14, 2007

(30) Foreign Application Priority Data

Oct. 15, 2003    (JP) .............................. 2003-355725

(51) Int. Cl.
*H02K 7/09* (2006.01)
(52) U.S. Cl. .................................................... 310/90.5
(58) Field of Classification Search ................. 310/90.5
See application file for complete search history.

(56) References Cited

U.S. PATENT DOCUMENTS

| | | | | |
|---|---|---|---|---|
| 4,353,602 A | * | 10/1982 | Habermann | ................ 310/90.5 |
| 4,697,114 A | * | 9/1987 | Amemiya et al. | ...... 310/156.61 |
| 5,914,548 A | * | 6/1999 | Watanabe et al. | ............. 310/88 |
| 6,121,704 A | * | 9/2000 | Fukuyama et al. | ......... 310/90.5 |
| 6,223,416 B1 | * | 5/2001 | Boyd et al. | .................... 29/596 |
| 2004/0021382 A1 | * | 2/2004 | Steinmeyer | ................ 310/90.5 |
| 2004/0112800 A1 | * | 6/2004 | Ogino et al. | ................. 209/199 |

FOREIGN PATENT DOCUMENTS

| | | |
|---|---|---|
| JP | 57-104777 | 6/1982 |
| JP | 3-70076 | 7/1991 |
| JP | 6-86576 | 3/1994 |
| JP | 10-288191 | 10/1998 |
| JP | 11-351186 | 12/1999 |
| JP | 2002218684 A * | 8/2002 |

OTHER PUBLICATIONS

Machine English Translation JP2002218684 (Aug. 2002).*
International Search Report of International Application PCT/JP2004/010071 mailed Oct. 26, 2004.

* cited by examiner

*Primary Examiner*—Quyen Leung
*Assistant Examiner*—Jose A Gonzalez Quinones
(74) *Attorney, Agent, or Firm*—Westerman, Hattori, Daniels & Adrian, LLP

(57) ABSTRACT

A case (100), a rotor (200) that is freely rotatably supported in the case (100), and stators (110) for rotating the rotor by magnetic force are provided. The stator (110) contains a core (111) mounted at the outside of the case (100), and a magnetic coil (112) wound around the core (111). An end face of the core (111) constituting a magnetic pole is formed of at least non-laminate ferromagnetic substance, and exposed to the inner surface of the case (100) so as to form a part of the inner wall of the case (100).

12 Claims, 6 Drawing Sheets

ACTUATOR

TECHNICAL FIELD

The present invention relates to an actuator having a mover freely movable in a case and stators for driving the mover by magnetic force, and particularly to an actuator suitably usable under high-vacuum or high-temperature environment.

BACKGROUND ART

A vacuum motor is known as an actuator used for a driving source such as a vacuum pump, a turbo molecular pump or the like. The vacuum motor is equipped with a rotor and a stator comprising an electromagnet for rotationally driving the rotor. As well known, the electromagnet is formed by winding a magnetic coil around a core. A laminate steel plate is used as the core constituting the electromagnet. The laminate steel plate is constructed by adhesively attaching plural thin steel plates to one another with resin adhesive agent.

It is required for the vacuum motor to keep the inside of the case to a high-vacuum atmosphere. In the conventional vacuum motor, a rotor and a stator are disposed in the case (JP-A-10-288191), and also a laminate steep plate is used as the core of an electromagnet constituting the stator, so that it is difficult to keep a high vacuum atmosphere in the case due to an effect of gas discharged from resin adhesive agent sandwiched between laminate steels.

Furthermore, when the vacuum motor is required to be operated under high temperature, a large amount of gas is discharged from resin adhesive agent sandwiched between laminate steel plates, it is further difficult to form a high-vacuum atmosphere.

The present invention has been implemented in view of the foregoing situation, and has an object to provide an actuator that can form a high-vacuum atmosphere in a case and also hold sufficient durability under operation at high temperature.

DISCLOSURE OF THE INVENTION

According to the present invention, an actuator comprising a case, a mover freely movable in the case and stators for driving the mover by magnetic force, is characterized in that each of the stators contains a core mounted at the outside of the case and a magnetic coil wound around the core, and at least an end face of the core constituting a magnetic pole is formed of non-laminated ferromagnetic substance and exposed to the inner surface of the case so as to form a part of the inner wall of the case.

Here, the mover may be constructed by a rotor that is freely rotatably supported in the case. In this case, the stators are disposed at a fixed interval in the peripheral direction so as to rotationally drive the rotor.

By disposing the stators at the outside of the case, the inside of the case is not affected by the discharge gas from the laminated steel plates even when the core constituting the stator is formed of laminated steel plates, and thus the inside of the case can be kept to the high vacuum atmosphere.

However, when the stators are merely disposed at the outside of the case, the interval between each stator and the rotor is increased, thus the magnetic force required for driving the rotor is weakened and there is a risk that sufficient torque cannot be achieved.

Therefore, according to the present invention, at least the end face of the core constituting the magnetic pole is formed of non-laminate ferromagnetic substance, and further the end face of the core is exposed to the inner face of the case, thereby narrowing the interval between the stator and the rotor. Accordingly, strong magnetic force can be achieved, and the rotor can be rotated with sufficiently large torque. The end face of the core is formed of non-laminate ferromagnetic substance, and thus even when the end face of the core is exposed to the inner surface of the case, no gas is discharged from the site concerning. In addition, the core formed of non-laminate ferromagnetic substance can hold high durability and high corrosion resistance even under high-temperature environment or a severely temperature-varying environment.

Furthermore, in an actuator having a magnetic bearing for supporting a mover in a non-contact style so that the mover is freely movable, it is preferable that the magnetic bearing has the same construction as the stator described above.

The magnetic bearing is equipped with an electromagnet for bearing and a ferromagnetic portion for bearing that is provided at a site confronting the magnetic pole of the bearing electromagnet in the mover.

The bearing electromagnet contains a core mounted on the outside of a case and a magnetic coil wound around the core, and at least an end face of the core constituting a magnetic pole is formed of non-laminate ferromagnetic substance and exposed to the inner surface of the case so as to form a part of the inner wall of the case.

Accordingly, even when the core constituting the magnetic bearing is formed of a laminate steel plate, the inside of the case can be kept to a high vacuum atmosphere without being affected by gas discharged from the laminate steel plate.

By forming at least the end face of the core constituting the magnetic pole of the non-laminate ferromagnetic substance and also exposing the end face of the core to the inner surface of the case, the interval between the magnetic bearing and the bearing ferromagnetic portion provided to the mover can be narrowed. Accordingly, the mover can be supported by strong magnetic force in a non-contact style. In this case, the end face of the core is also formed of non-laminate ferromagnetic substance, and thus even when the end face is exposed to the inner surface of the case, no gas is discharged from the corresponding site. In addition, the core formed of non-laminate ferromagnetic substance can hold high durability and high corrosion resistance even under high-temperature environment or a severely temperature-varying environment.

Furthermore, in the magnetic bearing, the bearing ferromagnetic portion is preferably formed of aggregated non-laminate ferromagnetic substance. By forming the bearing ferromagnetic portion of aggregated non-laminate ferromagnetic substance without using any laminate steel plate, there is no gas discharge source in the case, and thus the high vacuum atmosphere can be kept in the case.

As described above, even when the bearing ferromagnetic portion is formed of the aggregated non-laminate ferromagnetic substance, strong magnetic force can be generated between the end face of the core constituting the bearing electromagnet and the bearing ferromagnetic portion because the end face of the core constituting the bearing electromagnet is exposed to the inner surface of the case and the interval between the end face of the core and the bearing ferromagnetic portion is narrowed.

Here, when the mover is a rotor that is freely rotatably supported in the case, it is preferable that the bearing electromagnet and the bearing ferromagnetic portion are constructed as follows.

That is, the bearing electromagnet comprises a thrust electromagnet for supporting the rotor in the axial direction, and a radial electromagnet for supporting the rotor in the radial direction.

Furthermore, the bearing ferromagnetic portion comprises a thrust ferromagnetic portion provided to a site facing the magnetic pole of the thrust electromagnet, and a radial ferromagnetic portion provided to a site facing a magnetic pole of the radial electromagnet.

With the above construction, the rotor can be supported in a non-contact style in both the thrust direction (axial direction) and the radial direction, so that scattering of metal powder caused by friction can be prevented and also the high vacuum atmosphere can be kept.

Here, it is preferable that non-magnetic substance is interposed between respective bearing ferromagnetic portions in the rotor.

When the respective bearing ferromagnetic portions are adjacent to one another without being electromagnetically shielded, interference of lines of magnetic force from the neighboring bearing ferromagnetic portions occurs, and the magnetic force may be lowered. Therefore, by interposing the non-magnetic substance between the neighboring bearing ferromagnetic portion, the respective bearing ferromagnetic portions are magnetically shielded from one another, and thus such an adverse effect can be avoided.

Furthermore, the radial electromagnet contains first and second radial electromagnets for supporting two different positions of the rotor in the radial direction, and it is preferable that the radial ferromagnetic portion contains a first radial ferromagnetic portion provided to a site facing a magnetic pole of the first radial electromagnet and a second radial ferromagnetic portion provided to a site facing a magnetic pole of the second radial electromagnet.

Accordingly, the rotor is prevented from being inclined, and it can be supported in a fixed position at all times.

Here, it is preferable that the rotor contains a rotor portion having plural magnetic poles projected in the radial direction, and a rotational shaft portion extending in the axial direction on the same axis of the rotor portion, the rotational shaft portion is formed of non-magnetic substance, the first radial ferromagnetic portion is provided to one end portion in the axial direction of the rotational shaft portion, and the second radial ferromagnetic portion is provided to the other end portion in the axial direction of the rotational shaft portion.

With this construction, the rotor portion and each radial ferromagnetic portion can be magnetically shielded from each other by the rotational shaft portion of the non-magnetic substance, and the inference of lines of magnetic force can be avoided with a simple construction.

Furthermore, if the rotor portion of the rotor is formed of aggregated non-laminate ferromagnetic substance and also the thrust ferromagnetic portion is formed integrally with the rotor portion, it is unnecessary to provide thrust ferromagnetic portions separately from one another, so that the construction can be simplified and the manufacturing cost can be reduced.

Still furthermore, plural radial electromagnets are arranged at a fixed interval around the rotor. Here, when the core of each radial electromagnet has plural end faces serving as magnetic poles, these end faces are preferably juxtaposed with each other in the axial direction.

The arrangement as described above can avoid the adverse effect that the line of magnetic force discharged from the end face of the core of the radial electromagnet interferes with the line of magnetic force discharged from the end face of the core of the adjacent radial electromagnet and thus the magnetic force becomes unstable.

As described above, according to the present invention, the high vacuum atmosphere can be formed in the case, and also sufficient durability and corrosion resistance can be held under high temperature or the severely temperature-varying environment.

In the above-described construction, the mover may be designed to be freely linearly movable in the case, and the stators may be arranged at a fixed interval in the moving direction so as to move the mover linearly.

BEST MODES FOR CARRYING OUT THE INVENTION

Preferred embodiments of the present invention will be described with reference to the drawings.

Figure 1:
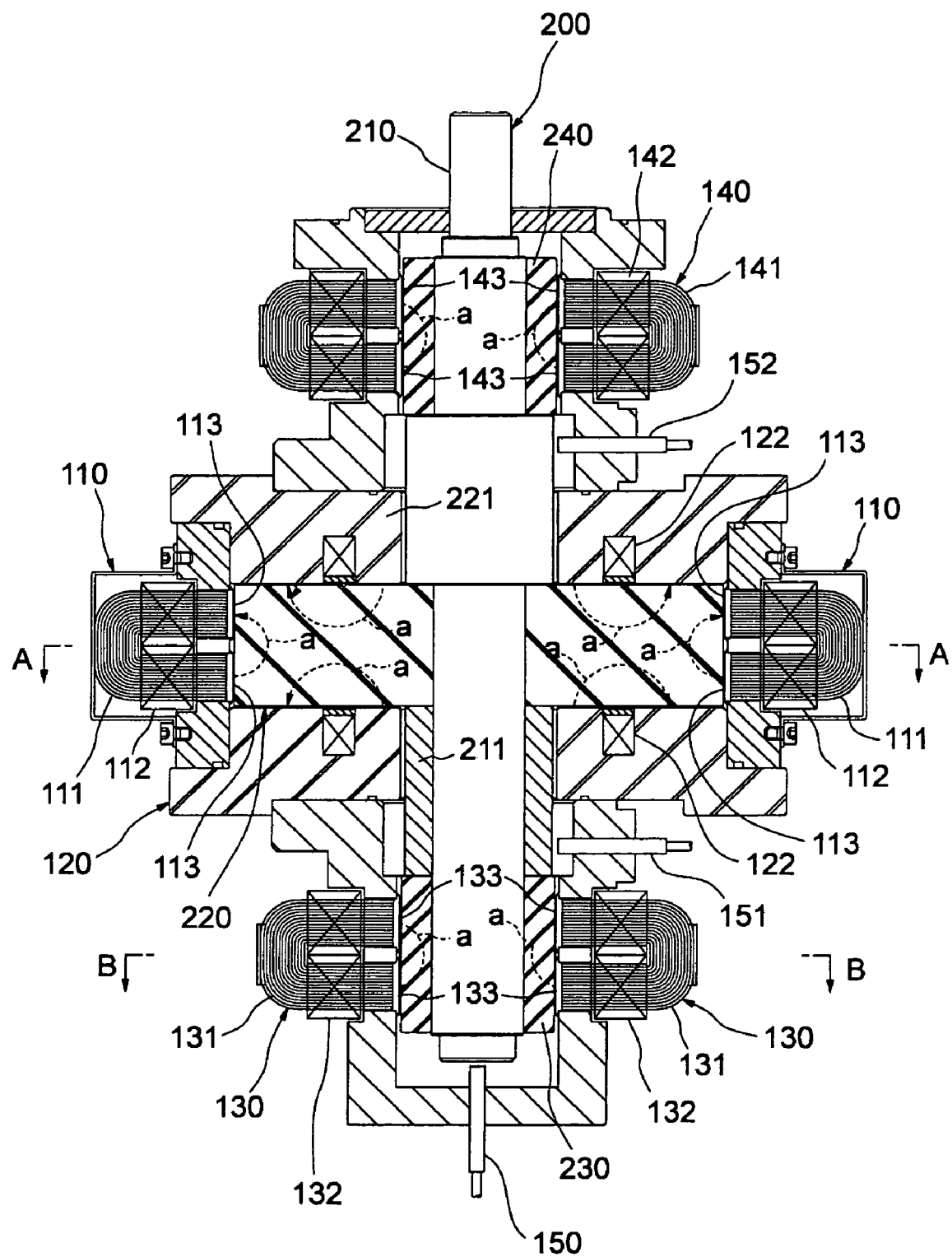
FIG. 1 is a cross-sectional front view showing an embodiment in which the present invention is applied to a rotary motor device.
Figure 2:
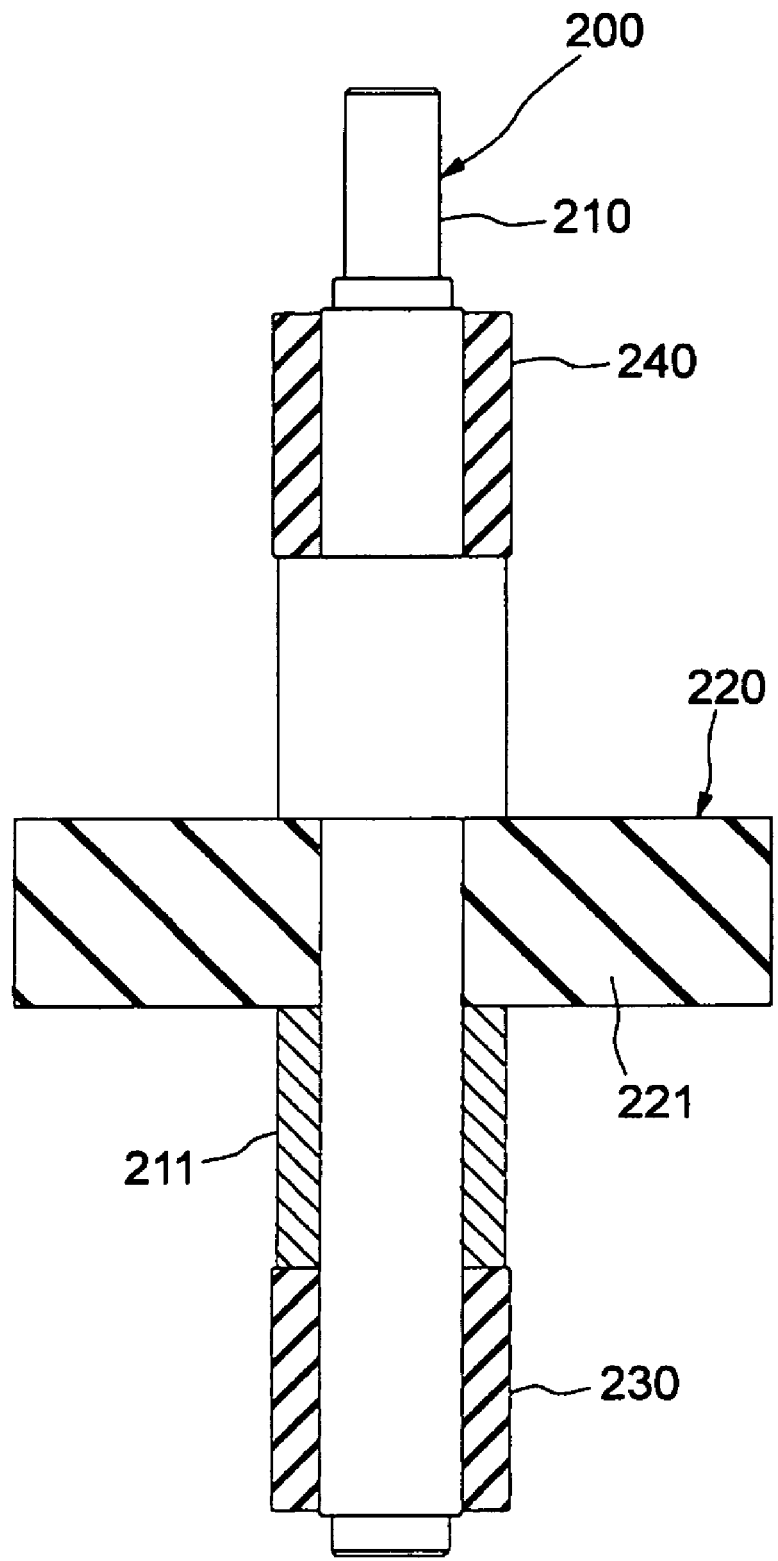
FIG. 2 is a partially cross-sectional front view showing the construction of a rotor.
Figure 3:
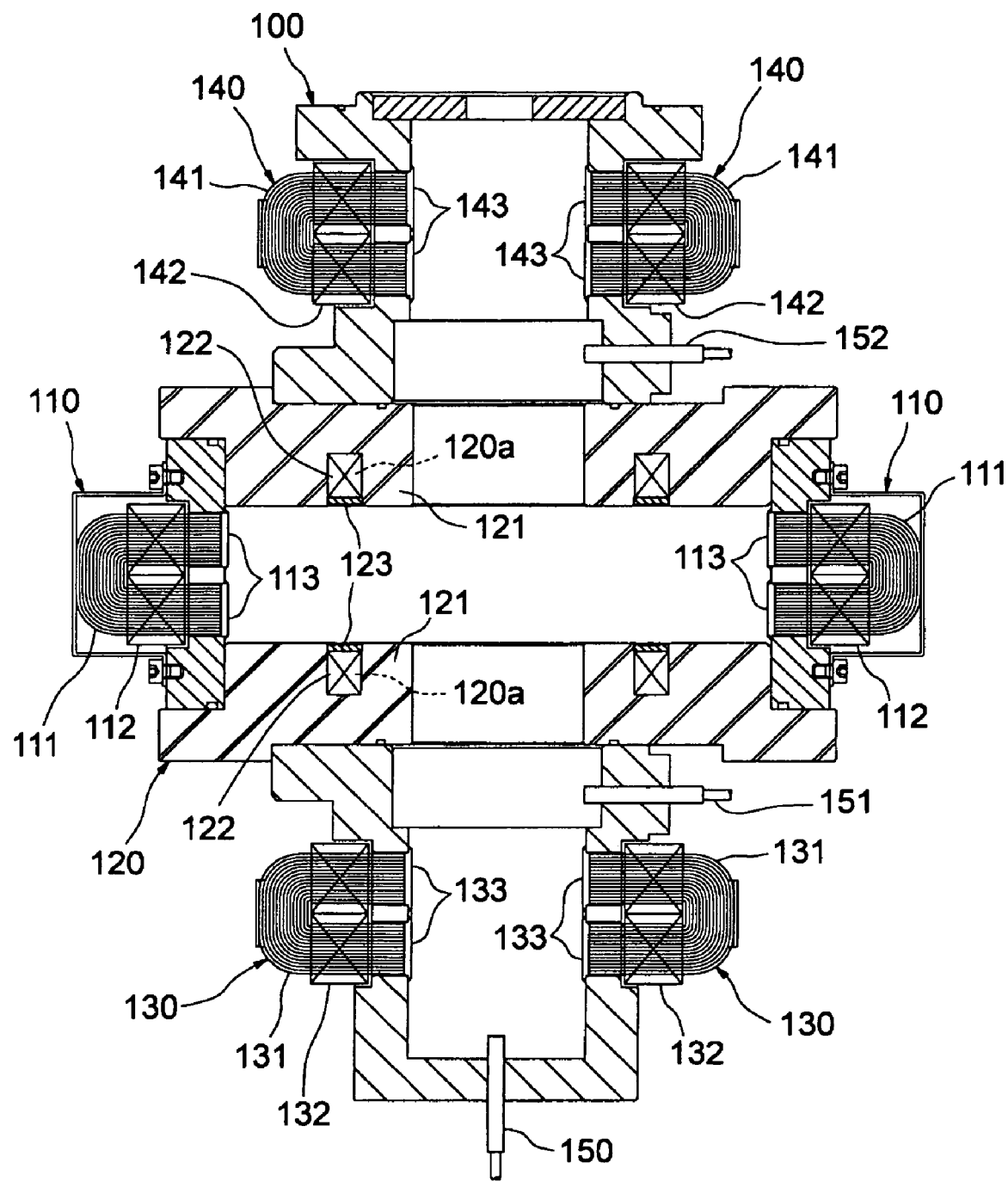
FIG. 3 is a cross-sectional front view showing a case and parts mounted in the case.

FIG. 1 is a cross-sectional front view showing an embodiment in which the present invention is applied to a rotary type motor device. FIGS. 2 and 3 are diagrams showing the constituent elements of the motor device shown in FIG. 1, and FIG. 2 is a partially cross-sectional front view showing the construction of the rotor. FIG. 3 is a cross-sectional front view showing a case and parts mounted there.

The motor device shown in these figures is equipped with a construction suitable to a vacuum motor operated under high temperature.

The motor device is equipped with a case 100, and a rotor 200 that is freely rotatably supported in the case 100.

As shown in FIG. 2, the rotor 200 is equipped with a round-bar type rotational shaft portion 210 formed of non-magnetic substance, and disc-shaped rotor portion 220 disposed substantially at the center. An annular first radial ferromagnetic portion 230 is engagedly mounted around the outer surface of one end portion of the rotational shaft portion 210. Furthermore, an annular second radial ferromagnetic portion 240 is engagedly mounted around the outer surface of the other end portion of the rotational shaft portion 210. A rotational shaft portion 210 formed of non-ferromagnetic substance or annular non-magnetic substance 211 is interposed between the rotor portion 220 and each radial ferromagnetic portion 230, 240.

With the above construction, the rotor portion 220 and each of the radial ferromagnetic portions 230, 240 can be magnetically shielded from each other by the rotational shaft portion 210 of the non-magnetic substance or the annular non-magnetic substance 211, and the interference between the lines of magnetic force can be avoided with a simple construction.

Figure 4:
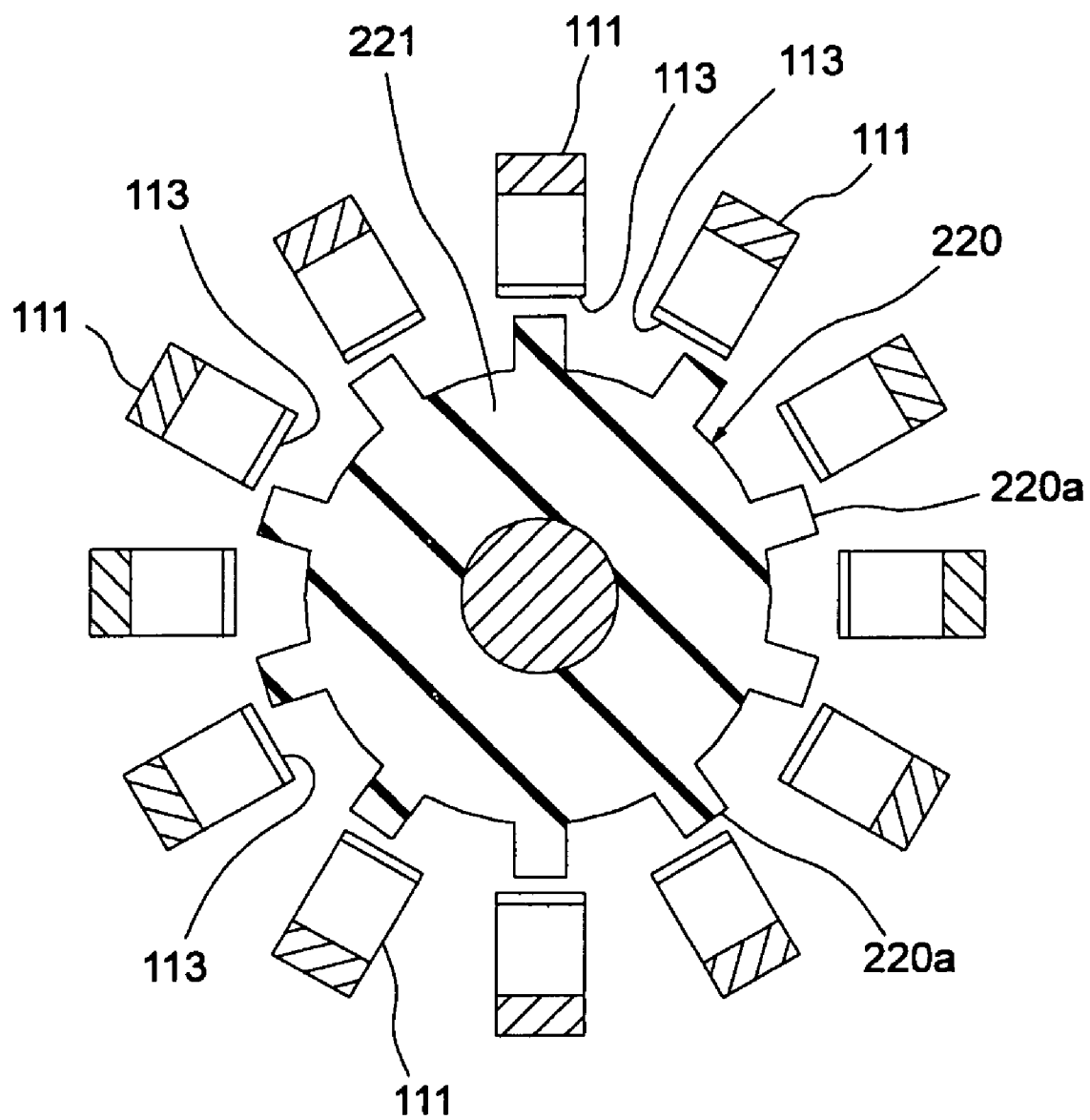
FIG. 4 is a cross-sectional view of A-A line of FIG. 1 with respect to a rotor portion and cores of stators.

The rotor portion 220 is formed of aggregated non-laminate ferromagnetic substance. As shown in FIG. 4, the rotor portion 220 is designed so that plural magnetic poles 220a are projected in the radial direction, and the inside portions (nearer to the center) of these magnetic poles form the thrust ferromagnetic portion 221.

The case 100 has a hollow inside, and the rotor 200 is accommodated in the hollow portion (see FIG. 1). As shown in FIG. 3, stators 110 are provided at the outside of the case 100, and respective bearing electromagnets such as thrust electromagnets 120, first radial electromagnets and second radial electromagnets 140 are provided. Furthermore, non-contact sensors 150, 151, 152 for detecting the interval between the rotor and each bearing electromagnet are provided. An eddy current sensor, an electrostatic capacity sensor, an optical sensor, etc. may be applied as these non-contact sensors.

Here, the rotor portion 220 and the stators 110 form the rotationally driving portion for rotating the rotor 200 by magnetic force. The stator 110 is a magnet comprising a U-shaped core 111, and an electromagnetic coil 112 wound around each arm portion of the core 111. The core 111 is formed of a laminate steel plate achieved by laminating plural thin steel plates, and a thin plate 113 of non-laminate ferromagnetic substance is attached to the end face of the core 111 (see FIG. 3). The stator 110 is mounted on the outside of the case 100 so that the end face of the core 111 to which the thin plate 113 of the non-laminate ferromagnetic substance is attached is exposed to the inner surface of the case 100. Here, the end face of the core 111 forms a part of the inner wall of the case 10.

Even when the core 111 constituting the stator 110 is formed of a laminate steel plate, the high vacuum atmosphere can be kept in the case 100 without being affected by the discharge gas from the laminate steel plates by disposing the stators 110 at the outside of the case 100. Furthermore, by exposing the end face of the core 111 to the inner surface of the case 100, the interval between the rotor 200 and each stator can be narrowed, and strong magnetic force can be achieved.

As shown in FIG. 4, a plurality of (twelve in FIG. 4) stators 110 are disposed at an equal interval around the rotor portion 220. Two end faces of the core 111 of each stator 110 are disposed along the axial direction. This arrangement can avoid the adverse effect that the line of magnetic force a discharged from the end face of the core 111 of ach stator 110 interferes with the line of magnetic force a discharged from the core of the neighboring stator 110, and thus the magnetic force becomes unstable.

The rotor portion 220 and the stators 110 rotates the rotor 200 on the basis of the operation principle of a switched reluctance motor (SR motor). That is, when current is supplied to the electromagnetic coil 112 of the stator 110, the end face of the core 111 serves as a magnetic pole to generate lines of magnetic force a from one end face thereof (see FIG. 1). The magnetic force line a draws a loop along which it passes through the magnetic pole 220 projectingly formed on the outer periphery of the rotor portion 220, and feeds back to the other end face of the core 111. The magnetic pole 220 of the rotor portion 220 is attracted by this magnetic line a, and approaches to the end face of the core 111 of the stator 110. By controlling current to be supplied to the respective magnetic coils 112 of the plural stators 110, the attraction force of the rotor portion 220 can be successively shifted in the peripheral direction, whereby the rotor 200 can be rotated.

The thrust electromagnet 120 and the thrust ferromagnetic portion 221, the first radial electromagnet 130 and the first radial ferromagnetic portion 230, and the second radial electromagnet 140 and the second radial ferromagnetic portion 240 are respectively paired to construct the magnetic bearings. That is, the thrust electromagnet 120 and the thrust ferromagnetic portion 221 have a function of magnetically floating the rotor 200 in the axial direction (upwardly), and the first radial electromagnet 130 and the first radial ferromagnetic portion 230 have a function of supporting one end portion of the rotor 200 in the radial direction in a non-contact style. The second radial electromagnet 140 and the second radial ferromagnetic portion 240 have a function of supporting the other end portion of the rotor 200 in the radial direction in a non-contact style.

A pair of thrust electromagnets 120 are provided to the intermediate portion in the axial direction of the case 100 so that the thrust ferromagnetic portion 221 formed integrally with the rotor portion 220 of the rotor 200 from the upper and lower sides (see FIG. 1).

In this embodiment, as shown in FIG. 3, the thrust electromagnet 120 comprises an annular core 121 formed of aggregated non-laminate ferromagnetic substance, an annular recess portion 121a formed at the intermediate portion of the core 121, and a magnetic coil 122 wound in the recess portion 121a. The core 121 and the magnetic coil 122 are provided coaxially with the case 100. The core 121 constructs a part of the case 100. In the pair of thrust electromagnets 120, the end faces of the cores 121 form the inner wall of the case 100, and the end faces of the cores 121 face the thrust ferromagnetic portion 221 from the upper and lower sides. The non-magnetic substance 123 is mounted in the opening portion of the recess portion 121a of the core 121 around which the magnetic coil 122 is wound, and the magnetic coil 122 is insulated from the hollow portion of the case 100 by the non-magnetic substance 123.

When current is supplied to the magnetic coil 122 of each thrust electromagnet 120, the end face of the core 121 serves as a magnetic pole and generates lines of magnetic force a (see FIG. 1). The thrust ferromagnetic portion 221 formed integrally with the rotor portion 220 of the rotor 200 is attracted from the upper and lower sides and magnetically floated at the intermediate portion. The upper and lower positions of the rotor 200 are monitored by the non-contact sensor 150, and the detection signal from the non-contact sensor 150 is fed back to control current to be supplied to the magnetic coil 122 so that the rotor 200 is kept in a magnetically floated state.

As shown in FIG. 3, the first radial electromagnet 130 comprises a U-shaped core 131 and an electromagnetic coil 132 wound around each arm portion of the core. The core is formed of a laminate steel plate achieved by laminating plural thin steel plates, and a thin plate 133 of the non-laminate ferromagnetic substance is attached to the end face. The first radial electromagnet 130 is mounted at the outside of the case 100. Here, the end face of the core 131 forms a part of the inner wall of the case 100.

As described above, the first radial electromagnet 130 is disposed at the outside of the case 100, and thus even when the core 131 constituting the first radial electromagnet 130 is formed of the laminate steep plate, a high vacuum atmosphere can be kept in the case 100 without being affected by the discharge gas from the laminate steel plate. Furthermore, by exposing the end face of the core 131 to the inner surface of the case 100, the interval between the rotor 200 and the end face of the core 131 can be narrowed and thus strong magnetic force can be achieved.

Figure 5:
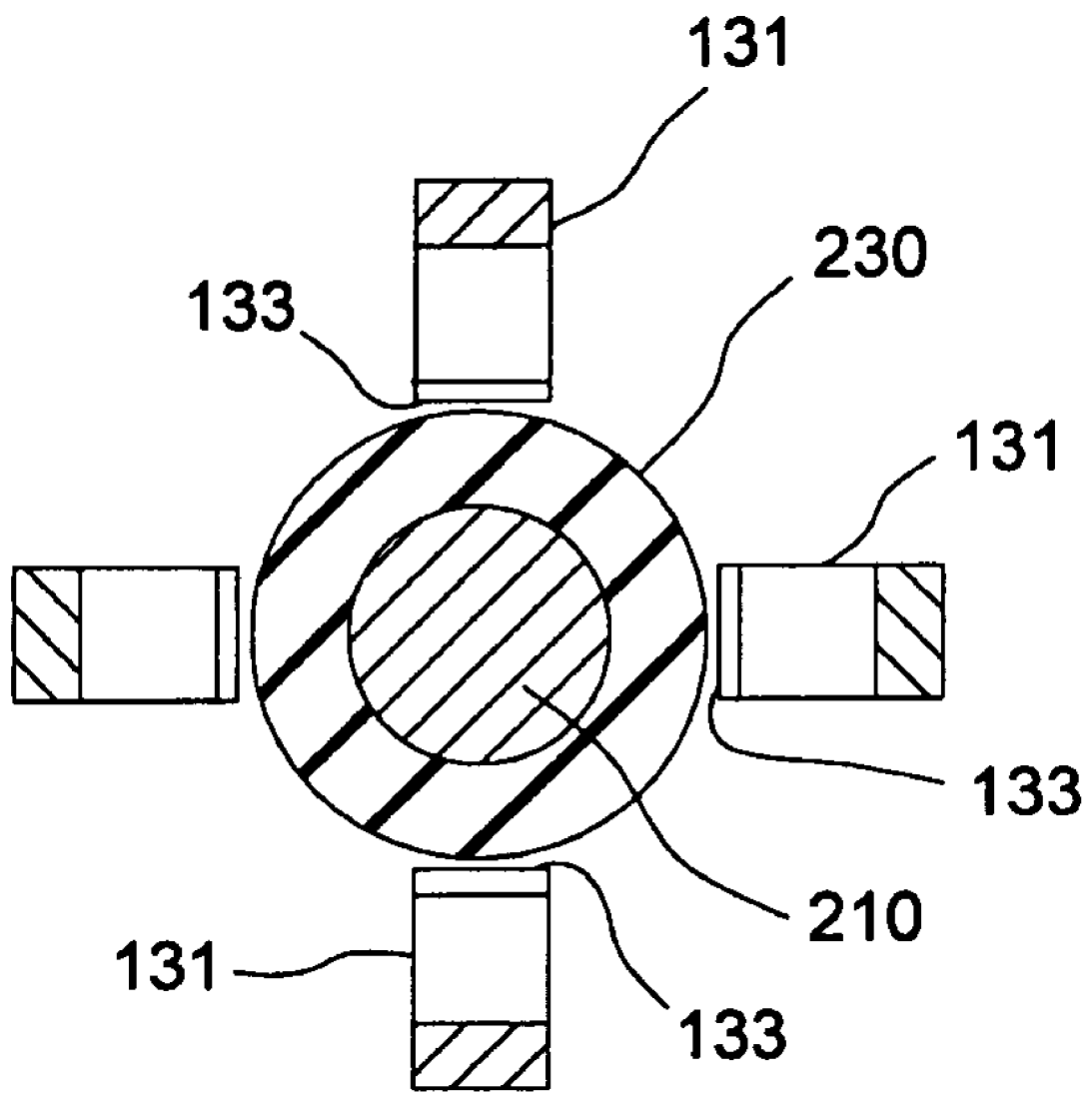
FIG. 5 is a cross-sectional view of B-B line of FIG. 1 with respect to a first radial ferromagnetic portion and cores of first radial electromagnets.

As shown in FIG. 5, a plurality of (four in FIG. 5) first radial electromagnet 130 are arranged at an equal interval around the first radial ferromagnetic portion 230 engagedly mounted around the outer surface of the rotational shaft 210 of the rotor 200. The end face of the core 131 of each first radial electromagnet 130 faces the first radial ferromagnetic portion 230.

Here, the two end faces of the core 131 of each first radial electromagnet 130 are juxtaposed with each other in the axial direction. This arrangement can avoid the adverse effect that the magnetic force line a disposed from the end face of the core of each firs radial electromagnet 130 interferes with the magnetic force line a discharged from the core 131 of the adjacent first radial electromagnet 130 and thus the magnetic force becomes unstable.

When current is supplied to the magnetic coil 132 of each first radial electromagnet 130, the end face of the core 131 serves as a magnetic pole to generate a magnetic force line a (see FIG. 1). The first radial ferromagnetic portion 230 engagedly mounted around the outer surface of the rotational shaft portion 21 of the rotor 200 is attracted in the radial direction by the magnetic force line a, and supported in a non-contact style at the intermediate portion between the rotational shaft portion 210 and the core 131. The inclination of one end portion of the rotor 200 is monitored by the non-contact sensor 151, and the detection signal from the non-contact sensor 151 is fed back to control current to be supplied to the magnetic coil 132 so that the one end portion of the rotor 200 is kept at a shaft center position.

As in the case of the first radial electromagnet 130, the second radial electromagnet 140 comprises a U-shaped core 141 and an electromagnetic coil 142 wound around each arm portion of the core 141. The core 141 is formed of a laminate steel plate achieved by laminating plural thin steel plates. A thin plate 143 of non-laminate ferromagnetic substance is attached to the end face of the core 141. The second radial electromagnet 140 is mounted at the outside of the case 100 so that the end face of the core 141 to which the thin plate 143 of non-laminate ferromagnetic substance is attached is exposed to the inner surface of the case 100. Here, the end face of the core 141 forms a part of the inner wall of the case 100.

As described above, by disposing the second radial electromagnet 140 at the outside of the case 100, a high vacuum atmosphere can be kept in the case 100 without being affected by discharge gas from the laminate steel plate even when the core 141 constituting the second radial electromagnet 140 is formed of the laminate steel plate. Furthermore, by exposing the end face of the core 141 to the inner surface of the case 100, the interval between rotor 200 and the core 141 can be narrowed, and thus strong magnetic force can be achieved.

With respect to the second radial electromagnet 140, a plurality of (in this embodiment, four as in the case of the first radial electromagnet 130) second radial electromagnets 140 are disposed at an equal interval around the second radial ferromagnetic portion 240 engagedly mounted around the outer surface of the rotational shaft portion 210 of the rotor 200. The end face of the core 141 of each second radial electromagnet 140 faces the second radial ferromagnetic portion 240.

In this case, when the two end faces of the core 141 of each second radial electromagnet 140 are juxtaposed with each other in the axial direction. This arrangement can avoid the adverse effect that the magnetic force line a discharged from the end face of the core 141 of each second radial electromagnet 140 interferes with the magnetic force line a discharged from the core 141 of the adjacent second radial electromagnet 140 and thus the magnetic force becomes unstable.

When current is supplied to the magnetic coil 142 of each second radial electromagnet 140, the end face of the core 141 serves as a magnetic pole to generate the magnetic force line a (see FIG. 1). By the magnetic force line a, the second radial ferromagnetic portion 240 engagedly mounted around the outer surface of the rotational shaft portion 210 of the rotor 200 is attracted in the radial direction and supported in a non-contact style at the intermediate portion thereof. The inclination of the other end portion of the rotor 200 is monitored by the non-contact sensor 152, and the detection signal from the non-contact sensor 152 is fed back to control the current to be supplied to the magnetic coil 142 so that the other portion of the rotor 200 is kept at the axial center position.

In the above-described embodiment, the rotor portion 220, the thin plates 113 attached to the end faces of the cores 111 of the stators 110, the cores 121 of the thrust electromagnets 120 and the first and second radial ferromagnetic portions 230, 240 are formed of non-laminate ferromagnetic substance. Stainless steel (electromagnetic stainless steel) which any number from 400 to 499 numbers is allocated in JIS (Japanese Industrial Standards) is known as non-laminated ferromagnetic substance suitable for each of the above members. In addition, pure iron, steel, alloy of Permendur (Fe50/Co50) or the like, ferrite or the like may be applied. However, the electromagnetic stainless steel described above is most preferable from the viewpoint that permeability is high, corrosion resistance is excellent, eddy current characteristic is good and gas adsorption performance is low.

OTHER EMBODIMENTS

The present invention is not limited to the above-described embodiment.

For example, the present invention may be applied to a motor device such as a stepping motor or the like.

Furthermore, the core of each of the stator 110, the first radial electromagnet 130 and the second radial electromagnet 140 may be constructed by aggregated non-laminate ferromagnetic substance.

In the above embodiment, the thrust ferromagnetic portion 221 is formed integrally with the rotor portion 220. However, the thrust ferromagnetic portion may be provided as a different member at a different place.

Furthermore, there can be constructed an actuator that magnetically floats a mover (corresponding to the rotor 200) by using only the thrust electromagnet 120 and the thrust ferromagnetic portion 221 constructed as described above).

Figure 6:
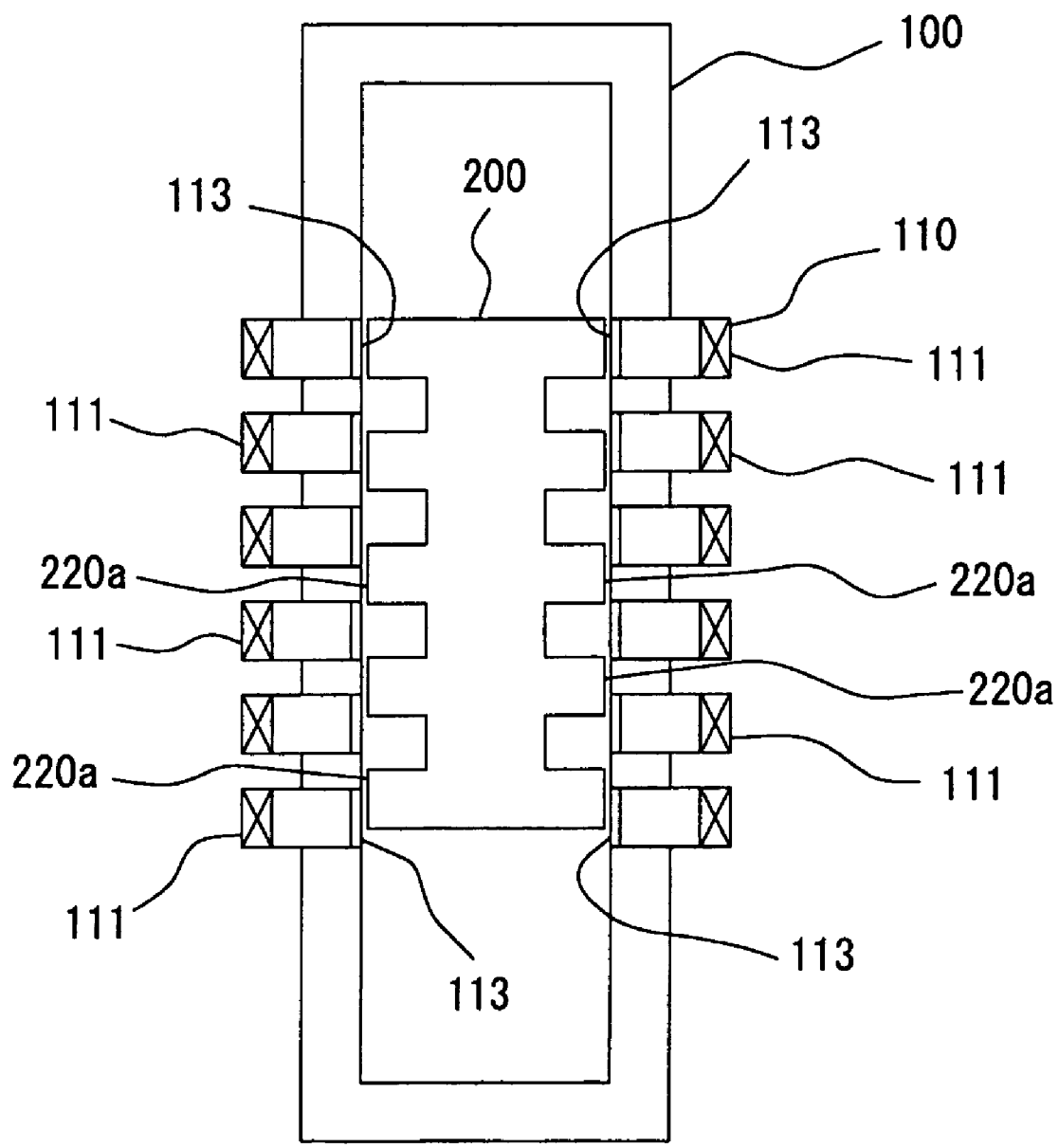
FIG. 6 is a cross-sectional front view showing an embodiment in which the present invention is applied to a linear motor.

FIG. 6 is a cross-sectional view showing another embodiment in which the present invention is applied to a linear motor. In the embodiment shown in FIG. 6, the same parts as or parts corresponding to the embodiment described above are represented by the same reference numerals, and the detailed description thereof is omitted.

The linear motor shown in FIG. 6 is equipped with a case 100, and a mover 200 that is freely movable linearly in the longitudinal direction in the case 100.

The mover 200 is formed of ferromagnetic substance, and plural magnetic poles 220a are projectingly formed at a fixed interval on the outer peripheral surface.

The case 100 is designed to have a hollow portion therein, and the mover 200 is accommodated in the hollow portion. Plural stators 110 are provided at the outside of the case 100 to be arranged at a fixed interval in the longitudinal direction.

Here, the magnetic poles 220a of the mover 200 and the stators 110 form a driving portion for driving the mover 200 linearly by magnetic force 220a. The stator 110 is an electromagnetic coil (not shown) comprising a U-shaped core 111 and an electromagnetic coil (not shown) around each arm portion of each core 111. The core 111 is formed of a laminate steep plate achieved by laminating plural thin steel plates, and a thin plate 13 of non-laminate ferromagnetic substance is attached to the end faces of the core 111.

The stators 110 are mounted at the outside of the case 100 so that the end faces of the core 111 to which the thin plates 113 of the non-laminate ferromagnetic substance are attached are exposed to the inner surface of the case 100. Here, the end face of the core 111 forms a part of the inner wall of the case 100.

By disposing the stators 110 at the outside of the case 100, a high vacuum atmosphere can be kept in the case 100 without being affected by discharge gas from the laminate steel plate even when the core 111 constituting each stator 110 is formed of the laminate steel plate. Furthermore, by exposing the end face of the core 111 to the inner surface of the case 100, the interval between the stator and the mover 200 can be narrowed, and strong magnetic force can be achieved.

When current is supplied to the magnetic coil (not shown) of the stator 110, the end faces of the core 111 serve as magnetic poles, and a magnetic force line is generated from one end face. This magnetic force line forms a loop that passes through the magnetic pole 220a projectingly formed on the outer periphery of the mover 200 and feeds back to the other end face of the core 111. By the magnetic force line, the magnetic pole 220a of the mover 200 is attracted, and approaches to the end faces of the core 111 of the stator 110. By controlling current to be supplied to the respective electromagnetic coils 112 of the plural stators 110, the attraction force to the magnetic pole 220a of the mover 200 is successively shifted in the longitudinal direction, whereby the mover 200 can be linearly moved.

The linear motor constructed shown in FIG. 6 may be applied as a magnetic levitated device for floating the mover 200 at any position and making it stationary there.

In the above-described embodiment, stainless steel (electromagnetic stainless steel) to which any number from 400 to 499 is allocated in JIS (Japanese Industrial Standards) is suitable for the mover 200 and the non-laminate ferromagnetic substance forming the thin plate 113 attached to the end face of the core 111 of the stator 110. In addition, pure iron, steel, alloy of Permendur (Fe50/Co50) or the like, ferrite or the like may be applied. However, the electromagnetic stainless steel described above is most preferable from the viewpoint that permeability is higher, the corrosion resistance is excellent, eddy current characteristic is good and gas adsorption performance is low.

INDUSTRIAL APPLICABILITY

According to the present invention, the high vacuum atmosphere can be formed in the case, and also sufficient durability and corrosion resistance can be held even under high temperature or under severely temperature-varying atmosphere.

The invention claimed is:

1. An actuator, comprising:
a case,
a mover freely movable in the case, and
stators for driving the mover by magnetic force,
wherein each of the stators contains a core mounted at the outside of the case and a magnetic coil wound around the-core, and
wherein at least an end face of the core constituting a magnetic pole is formed of non-laminated ferromagnetic substance and is exposed to the inner surface of the case so as to form a part of the inner wall of the case.

2. The actuator according to claim 1,
wherein the mover is a rotor that is freely rotatably supported in the case, and
wherein the stators are disposed at a fixed interval in the peripheral direction so as to rotationally drive the rotor.

3. The actuator according to claim 1,
wherein the mover is linearly freely movable in the case, and
wherein the stators are arranged at a fixed interval in the moving direction on the case so as to linearly drive the mover.

4. An actuator, comprising:
a case,
a mover freely movable in the case,
stators for driving the mover by electromagnetic force, and
a magnetic bearing for supporting the mover in a non-contact style so that the mover is freely movable,
wherein the magnetic bearing is equipped with a bearing electromagnet and a bearing ferromagnetic portion provided to a site facing a magnetic pole of the bearing electromagnet in the mover,
wherein the bearing electromagnet contains a core mounted at the outside of the case and a magnetic coil wound around the core,
wherein at least an end face constituting the magnetic pole is formed of non-laminate ferromagnetic substance and is exposed to the inner surface of the case so as to form a part of the inner wall of the case.

5. The actuator according to claim 4,
wherein the mover is a rotor that is freely rotatable supported in the case, and
wherein the stators are arranged at a fixed interval in the peripheral direction on the case so as to rotate the rotor.

6. The actuator according to claim 5, wherein a non-magnetic substance is interposed between the rotor and the bearing ferromagnetic portion.

7. The actuator according to claim 5,
wherein the bearing electromagnet contains a thrust electromagnet for supporting the rotor in the axial direction and a radial electromagnet for supporting the rotor in the radial direction, and
wherein the bearing ferromagnetic portion contains a thrust ferromagnetic portion provided to a site facing a magnetic pole of the thrust electromagnet, and a radial ferromagnetic portion provided to a site facing a magnetic pole of the radial electromagnet.

8. The actuator according to claim 7,
wherein the radial electromagnet contains first and second radial electromagnets for supporting the rotor in radial direction at different two positions thereof, and
wherein the radial ferromagnetic portion contains a first radial ferromagnetic portion provided to a site facing a magnetic pole of the first radial electromagnet, and a second radial ferromagnetic portion provided to a site facing a magnetic pole of the second radial electromagnet.

9. The actuator according to claim 8,
wherein the rotor contains a rotor portion having plural magnetic poles projecting in the radial direction and a rotational shaft portion that is coaxial with the rotor portion and extends in the axial direction,
wherein the rotational shaft portion is formed of non-magnetic substance,
wherein the first radial ferromagnetic portion is provided to one end portion in the axial direction of the rotational shaft portion, and
wherein the second radial ferromagnetic portion is provided to the other end portion in the axial direction of the rotational shaft portion.

10. The actuator according to claim 7,
wherein a rotor portion of the rotor is formed of an aggregated non-laminate ferromagnetic substance, and
wherein the thrust ferromagnetic portion is formed integrally with the rotor portion.

11. The actuator according to claim 4,
wherein the mover is freely linearly movable in the case, and
wherein the stators are arranged at a fixed interval in the moving direction on the case so as to drive the mover linearly.

12. The actuator according to claim 4, wherein the bearing ferromagnetic portion is formed of an aggregated non-laminate ferromagnetic substance.

* * * * *